(12) United States Patent
Babanov et al.

(10) Patent No.: US 7,693,860 B2
(45) Date of Patent: Apr. 6, 2010

(54) METHOD AND SYSTEM TO ASSOCIATE CELL AND ITEM METADATA

(75) Inventors: Alexander A. Babanov, Redmond, WA (US); Charles D. Ellis, Seattle, WA (US); Howard J. Dickerman, Bellevue, WA (US); Robert G. Hawking, Seattle, WA (US)

(73) Assignee: Microsoft Corporation, Redmond, CA (US)

( * ) Notice: Subject to any disclaimer, the term of this patent is extended or adjusted under 35 U.S.C. 154(b) by 493 days.

(21) Appl. No.: 11/083,492

(22) Filed: Mar. 18, 2005

(65) Prior Publication Data

US 2006/0212469 A1    Sep. 21, 2006

(51) Int. Cl.
*G06F 7/00* (2006.01)
*G06F 17/00* (2006.01)

(52) U.S. Cl. .................................... 707/102; 715/212
(58) Field of Classification Search ........................ None
See application file for complete search history.

(56) References Cited

U.S. PATENT DOCUMENTS

| | | | | |
|---|---|---|---|---|
| 5,175,810 A * | 12/1992 | Young et al. | ................. | 715/217 |
| 5,280,575 A * | 1/1994 | Young et al. | ................. | 715/255 |
| 5,845,300 A | 12/1998 | Comer et al. | ............... | 715/203 |
| 5,874,955 A * | 2/1999 | Rogowitz et al. | ........... | 345/589 |
| 6,317,750 B1 | 11/2001 | Tortolani et al. | ........ | 707/103 R |
| 6,377,965 B1 | 4/2002 | Hachamovitch et al. | .... | 715/203 |
| 6,460,059 B1 * | 10/2002 | Wisniewski | ................. | 715/212 |
| 6,564,213 B1 | 5/2003 | Ortega et al. | .................... | 707/5 |
| 6,626,959 B1 | 9/2003 | Moise et al. | ................. | 715/522 |
| 6,631,497 B1 * | 10/2003 | Jamshidi et al. | ............. | 715/205 |
| 6,640,234 B1 * | 10/2003 | Coffen et al. | ................ | 715/219 |
| 6,728,724 B1 | 4/2004 | Megiddo et al. | ............ | 707/102 |
| 6,757,867 B2 * | 6/2004 | Bauchot et al. | ............. | 715/220 |
| 6,829,607 B1 | 12/2004 | Tafoya et al. | ................... | 707/6 |
| 6,907,428 B2 | 6/2005 | Fitzpatrick et al. | ............ | 707/10 |
| 7,043,476 B2 * | 5/2006 | Robson | ......................... | 707/7 |
| 7,324,991 B1 | 1/2008 | Anjur | ............................ | 707/5 |
| 7,337,163 B1 | 2/2008 | Srinivasan et al. | ............. | 707/3 |
| 7,415,481 B2 * | 8/2008 | Becker et al. | ............... | 707/102 |
| 2002/0013786 A1 | 1/2002 | Machalek | .................... | 707/503 |
| 2002/0046131 A1 * | 4/2002 | Boone et al. | .................. | 705/26 |

(Continued)

FOREIGN PATENT DOCUMENTS

KR        10-0289065        5/1999

(Continued)

OTHER PUBLICATIONS

Office Action (Non-Final) dated Oct. 10, 2007, issued in U.S. Appl. No. 11/268,048, 16 pgs.

(Continued)

*Primary Examiner*—Khanh B Pham
*Assistant Examiner*—Azam Cheema
(74) *Attorney, Agent, or Firm*—Merchant & Gould PC

(57) ABSTRACT

The present invention generally relates to new and improved embodiments of methods and systems for capturing and providing arbitrarily rich data to be stored or manipulated within a spreadsheet. In one embodiment of the present invention, a method for creating spreadsheet metadata comprises receiving an item in a spreadsheet, receiving item metadata about the item, and associating the item metadata with the item to create spreadsheet metadata.

11 Claims, 9 Drawing Sheets

U.S. PATENT DOCUMENTS

| | | | |
|---|---|---|---|
| 2002/0184260 A1 | 12/2002 | Martin et al. | 707/503 |
| 2002/0194217 A1* | 12/2002 | Hoffman et al. | 707/503 |
| 2003/0009649 A1 | 1/2003 | Martin et al. | 712/1 |
| 2003/0026143 A1 | 2/2003 | Brennan | 365/200 |
| 2003/0033288 A1 | 2/2003 | Shanahan et al. | 707/3 |
| 2003/0055832 A1 | 3/2003 | Roccaforte | 707/100 |
| 2003/0055843 A1 | 3/2003 | Chiu | 707/104.1 |
| 2004/0237029 A1 | 11/2004 | Medicke et al. | 715/503 |
| 2005/0010565 A1 | 1/2005 | Cushing et al. | 707/3 |
| 2005/0027750 A1* | 2/2005 | Martin et al. | 707/200 |
| 2005/0091206 A1 | 4/2005 | Koukerdijinian et al. | 707/3 |
| 2005/0165825 A1* | 7/2005 | Turski et al. | 707/102 |
| 2005/0183002 A1* | 8/2005 | Chapus | 715/505 |
| 2005/0184260 A1 | 8/2005 | Fageraas et al. | 250/573 |
| 2005/0223027 A1* | 10/2005 | Lawrence et al. | 707/103 R |
| 2005/0223061 A1* | 10/2005 | Auerbach et al. | 709/206 |
| 2006/0010367 A1* | 1/2006 | Sattler et al. | 715/503 |
| 2006/0015805 A1 | 1/2006 | Humenansky et al. | 715/503 |
| 2006/0107196 A1 | 5/2006 | Thanu et al. | 715/503 |
| 2006/0129598 A1 | 6/2006 | Anjur et al. | 707/102 |
| 2006/0129929 A1 | 6/2006 | Weber et al. | 715/538 |
| 2007/0027904 A1 | 2/2007 | Chow et al. | 707/102 |
| 2007/0208721 A1 | 9/2007 | Zaman et al. | 707/4 |
| 2007/0219956 A1* | 9/2007 | Milton | 707/3 |
| 2008/0294612 A1 | 11/2008 | Wiles | 707/4 |

FOREIGN PATENT DOCUMENTS

| | | |
|---|---|---|
| WO | WO 03/088063 | 10/2003 |

OTHER PUBLICATIONS

Office Action (Non-Final) dated Jan. 18, 2008, issued in U.S. Appl. No. 11/251,598, 17 pgs.
Office Action (Non-Final) dated Feb. 4, 2008, issued in U.S. Appl. No. 11/222,928, 12 pgs.
Office Action (Non-Final) dated Feb. 19, 2008, issued in U.S. Appl. No. 11/325,372, 14 pgs.
Office Action (Final) dated Jul. 22, 2008, issued in U.S. Appl. No. 11/268,048, 19 pgs.
Office Action (Final) dated Sep. 3, 2008, issued in U.S. Appl. No. 11/222,928, 15 pgs.
Office Action (Final) dated Oct. 15, 2008, issued in U.S. Appl. No. 11/251,598, 13 pgs.
Office Action (Final) dated Nov. 12, 2008, issued in U.S. Appl. No. 11/325,372, 10 pgs.
Office Action (Non-Final) dated Feb. 24, 2009, issued in U.S. Appl. No. 11/268,048, 18 pgs.
Office Action (Non-Final) dated Apr. 14, 2009, issued in U.S. Appl. No. 11/222,928, 17 pgs.
Office Action (Non-Final) dated Jul. 8, 2009, issued in U.S. Appl. No. 11/251,598, 15 pgs.
Office Action (Non-Final) dated Jul. 13, 2009, issued in U.S. Appl. No. 11/325,372, 12 pgs.
Office Action (Final) dated Sep. 23, 2009, issued in U.S. Appl. No. 11/268,048, 21 pgs.
International Search Report for PCT/US2006/034987, Feb. 26, 2007, 10 pgs.
International Search Report mailed Sep. 26, 2003 in PCT/IB03/01444, 1 pg.
"Tutorial 26: MSAS: Office 2000 OLAP Components", Http://www.exforsys.com/content/view/1349, last accessed Sep. 8, 2005, 7 pgs.
"What is XLCubed Explorer", http://www.xlcubed.com/explorer.htm, last accessed Sep. 8, 2005, 2 pgs.
"Excel Simplicity.Advanced OLAP Capabilities.WebEnabled", http://paristech.com/index2.html, Sep. 8, 2005, 3 pgs.
"SPSS Base", http://vvww.spss-sa.com/products/body.htm, last accessed Sep. 8, 2005, 12 pgs.

* cited by examiner

US 7,693,860 B2

METHOD AND SYSTEM TO ASSOCIATE CELL AND ITEM METADATA

TECHNICAL FIELD

The present invention relates generally to spreadsheet software applications. More particularly, the present invention relates to information about data within a spreadsheet.

BACKGROUND OF THE INVENTION

Spreadsheet software or applications are relatively well-known and useful tools. Typical spreadsheet applications simulate physical spreadsheets by capturing, displaying, and manipulating data arranged in rows and columns. At the intersection of the columns and the rows are cells. Cells within spreadsheets can contain: a number, a string, an error value, a blank value, etc. Furthermore, cells may also contain formulas that can operate on data in other cells and display the results. These formulas empower the user to create calculations and business logic that helps the user exploit the data.

Generally, spreadsheets are limited to the types of data or information that the spreadsheet can capture or manipulate. For example, spreadsheets may be able to display a currency as dollar sign followed by a number, or as a British Pound symbol followed by a number, but the spreadsheet is unable to specify how the currency is to be manipulated in mathematical formulas. Thus, when performing operations on the data, such as adding two different currencies, the spreadsheet fails to arrive at the correct result because the spreadsheet is unable to recognize that the two monetary values are different currencies and compensate for the exchange rate. As shown by this example, spreadsheets offer limited or, in some cases, incorrect functionality because of the limitations of the types of data the spreadsheets capture. It is with respect to these and other considerations that the present invention has been made.

SUMMARY OF THE INVENTION

The present invention generally relates to new and improved embodiments of methods and systems for capturing and providing arbitrarily rich data to be stored or manipulated within the spreadsheet. In one embodiment of the present invention, a method for creating spreadsheet metadata comprises receiving an item in a spreadsheet, receiving item metadata about the item, and associating the item metadata with the item to create spreadsheet metadata.

In another embodiment of the present invention, a computer system has components that comprise a spreadsheet data store storing at least one item in at least one cell of a spreadsheet, a metadata store storing at least one item metadata associated with an item in the spreadsheet, and a calculation engine operable to conduct operations utilizing the item and the item metadata for the item.

Another embodiment of the present invention relates to a data structure that comprises a first data field that represents one or more cells within a spreadsheet, a second data field that contains one or more items within the one or more cells, and a third data field that contains item metadata associated with an item in the spreadsheet.

The invention may be implemented as a computer process, a computing system, or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detailed description of exemplary embodiments of the invention, and to the appended claims.

DETAILED DESCRIPTION OF THE INVENTION

The present invention will now be described more fully hereinafter with reference to the accompanying drawings, in which embodiments of the invention are shown. The invention may however, be embodied in many different forms and should not be construed as limited to the embodiments set forth herein. Rather, these embodiments are provided so that the disclosure will be thorough and complete and will fully convey the scope of the invention to those skilled in the art.

The present invention relates to new and improved embodiments of methods and systems that create spreadsheet metadata. In embodiments of the present invention, an item is received in the spreadsheet. An item is any information that is contained within one or more cells and may be considered an "object" having some type of "data." In embodiments, an item is an alphanumeric entry, a value, a result of a formula, a link to data, etc. In further embodiments, metadata about the item or cell containing the item is received. In embodiments of the present invention, metadata type is a property with a type name and a type value. Some types of metadata exist only once for an item or cell, while other types of metadata have several values for that type of metadata. In one embodiment, the metadata type, defined by the property name, is used to determine how the metadata is to be utilized. More description of metadata types and values is described hereinafter.

In embodiments, metadata has at least two general types: item metadata and cell metadata. Item metadata is any information about the item. Item metadata exposes standard interfaces, such as interfaces for conversion to a numeral or string value or may expose different interfaces. For example, if the item is a monetary value, the item metadata is the currency of the value; if the item is a measurement, the item metadata may be the units, such as inches, grams, Kelvin, etc. The item metadata and the item are associated. Associating the item metadata and the item, in embodiments, both captures the item metadata and makes the item metadata available to processes or operations utilizing the item. Cell metadata is information about the cell or cells containing one or more items. It should be noted that exemplary embodiments of item metadata and cell metadata are provide hereinafter. One skilled in the art will recognize that the types and properties of the metadata are extensible and other metadata may be integrated into the present invention.

Figure 1:
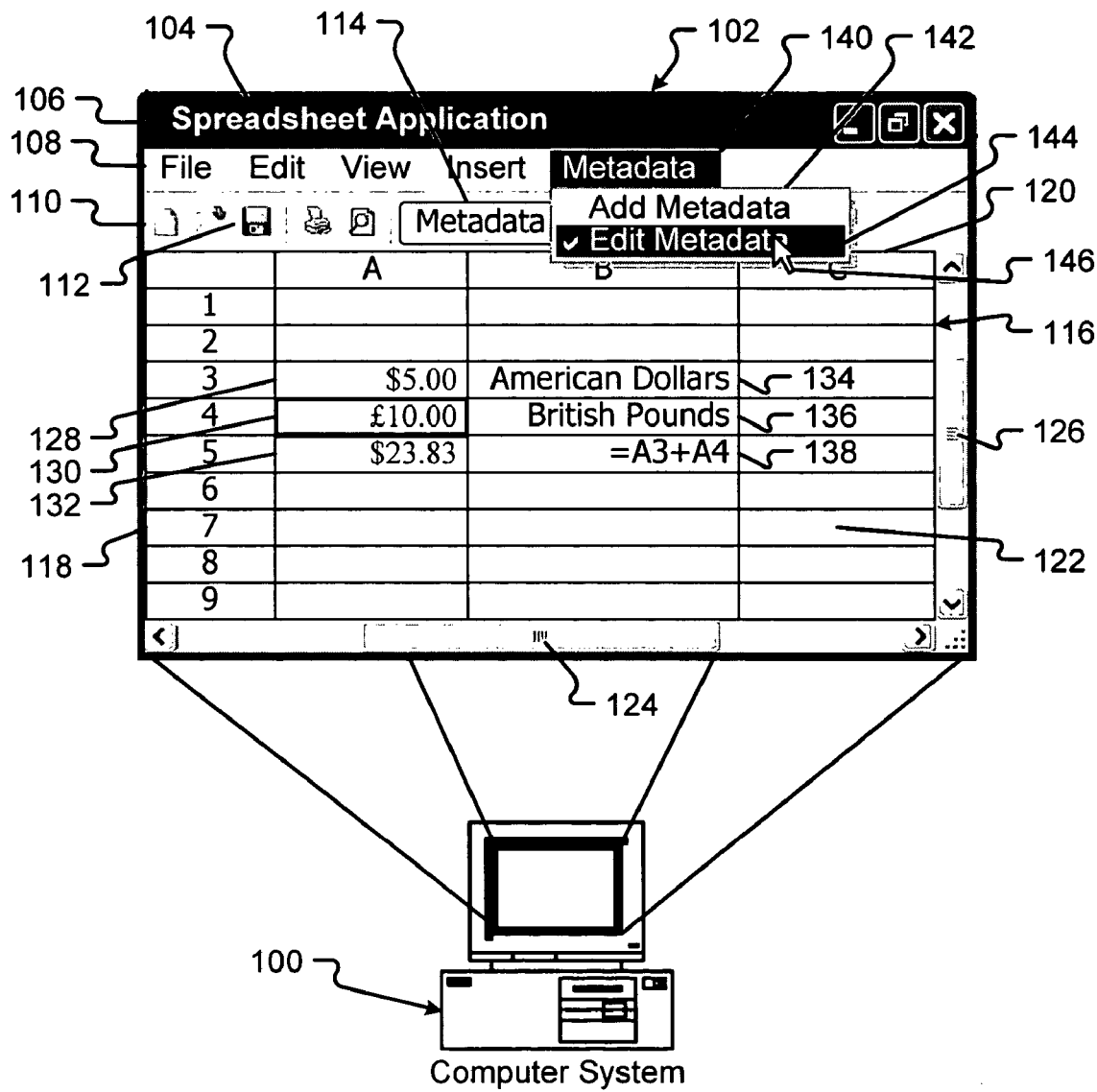
FIG. 1 is an exemplary embodiment of a spreadsheet containing items that have item metadata associated with the items according to the present invention.

A computer system 100 that may be used to create a spreadsheet having one or more items with associated metadata in accordance with the present invention is shown in FIG. 1. As used herein, a "computer system" shall be construed broadly and is defined as, "one or more devices or machines that execute programs for displaying and manipulating text, graphics, symbols, audio, video, and/or numbers."

The computer system 100 displays information, such as display screen 102. The display screen 102 is enlarged to show details of the display. The display 102 relates to an over-simplified display of an example spreadsheet application with the capability of creating and associating metadata. Importantly, although display 102 displays a spreadsheet, other types of software applications may be used to associate metadata in accordance with the present invention and thus, the spreadsheet example is not meant as a limitation, but merely as an illustration.

In this particular example, the display 102 has a spreadsheet window 104 with a title bar 106. Spreadsheet window 104 has a menu bar 108 and a tool bar 110. Tool bar 110 provides user controls such as a save control 112 or metadata control 114, among potentially many others. Such user interface controls are generally known in the art and are useful in managing certain types of information.

Within the spreadsheet window 104, there is a spreadsheet 116. The spreadsheet 116 is formed by intersecting rows, such as row 7 118, and columns, such as column C 120. The intersecting rows and columns form cells, such as cell C7 122, which are identified by the cell's corresponding column and row, e.g., cell C7 122 is in column C 120 and row 7 118. The spreadsheet 116 shown in FIG. 1 has three columns and nine rows. However, the spreadsheet 116 may include many more rows and columns as represented by the scroll bars 124 and 126.

A cell is both a display and a container within the spreadsheet. As such, each cell can display an item and contain the item. For example, cell A3 128 in FIG. 1 displays the item "$5.00," which represents a monetary value contained by the cell A3 128. Cell A4 130 displays the item "£10.00," and cell A5 displays the item "$23.82." Cell A4 130 contains the item having a monetary value that represents the displayed "£10.00" shown in the cell. Contrary to cells A3 128 and A4 130, cell A4 132 contains an item that is a formula, "=A3+A4," which instructs the spreadsheet to calculate the sum of the value contained in cell A3 with the value contained in cell A4 and return and display the result in cell A5. In embodiments, the items in the cells are from various user input into the spreadsheet, such as the user manual typing the value or the user copying and pasting the value into the cell.

In embodiments of the present invention, the spreadsheet 116 associates item metadata with an item in the spreadsheet 116. Item metadata is any type of information about an item contained in one or more cells. Item metadata is different from cell metadata, which is any type of information about the cell and not about the item contained in the cell. In the particular example in FIG. 1, three item metadata inputs 134, 136, and 138 are displayed in the spreadsheet 116. It should be noted that while metadata may be shown in a spreadsheet, the metadata is associated with one or more cells or items and is stored as underlying data that creates the displayed spreadsheet. Thus, in most embodiments, the metadata is not displayed, or, if it is displayed, the metadata is not displayed in adjoining or adjacent cells, as shown in FIG. 1, but as attached or associated with the item in the cell or the cell itself. To simplify the explanation, the item metadata 134, 136, and 138 are shown as displayed in the spreadsheet 116. Item metadata 134 is associated with cell A3 128 and represents the currency of the monetary value contained in cell A3 128. Likewise, item metadata 136 is associated with cell A4 130 and represents the currency of the monetary value contained in cell A4 130. Item metadata 138 is associated with cell A5 132 and represents the formula used to calculate the monetary value displayed in cell A5 132. In embodiments each cell has one or more pieces or entries of item metadata. In addition, two or more cells may have one item metadata, and one or more cells may have the same item metadata.

In some embodiments, to receive item metadata, the user may directly input the item metadata, the user may incidentally input the item metadata, or a function may set the item metadata. To enter the item metadata directly, the user, in embodiments of the present invention, selects a metadata control 114 with a cursor 146. The metadata control 114 provides further controls, such as a text box or other user entry device, to receive the item metadata. In another embodiment, the user selects a "metadata" menu 140 with a cursor 146, which may provide the controls to enter the item metadata, or may provide further submenus, such as the "add metadata" submenu 142 and the "edit metadata" submenu 144 that, upon selection of the submenu, provide the controls for inputting the item metadata. To input the item metadata incidentally, the user can perform an operation that also creates item metadata. For example, if the user changed the display of the monetary value in cell A4 130 to insert the British Pounds symbol "£," the user may also create item metadata 136 for the currency, which represents the monetary value in cell A4 130 has a currency of British Pounds.

In embodiments of the present invention, the item metadata is available to operations that utilize the items with which the item metadata is associated. For example, a calculation engine that performs the summation of cells A3 128 and A4 130 required by the formula contained in cell A5 132 uses the item metadata to change the operation of the sum. If the sum operation was not altered, the sum would result in a value of $15.00 being displayed in cell A5 132, e.g., 5.00+10.00=15.00. However, the result in cell A5 132 is $23.83. The result of the sum is due to the calculation engine reading the item metadata 136 associated with the value contained in cell A4 130 to recognize that the currency is in British Pounds, which is different than the currency, American Dollars, corresponding to the item metadata 134 associated with the value contained in cell A3 128. The calculation engine was able to convert the value in cell A4 130 from British Pounds to American Dollars using an available exchange rate before adding together the values contained in cell A3 128 and A4 130. As shown by this example, the item metadata is available to any operation in the spreadsheet 116 or the spreadsheet application shown in spreadsheet window 104.

In embodiments of the present invention, a default for certain functions using item metadata is established. For example, a default may be set such that all currencies having item metadata and being input into a currency conversion are changed to American Dollars. In one embodiment, the default is automatically established. For example, the calculation engine sets the default to the item metadata of the first entry in the calculation. Thus, in the sum in cell A5 132, the first entry, cell A3 128, is in American Dollars, and the default is set to American Dollars. In another embodiment, the user may set the default. For instance, the user may establish settings for the application such that those settings provide the default values. Thus, a user in England may establish a currency default setting that establishes all currencies to be converted to British Pounds. One skilled in the art will recognize other methods for establishing the defaults that are incorporated into the present invention.

Figure 2:
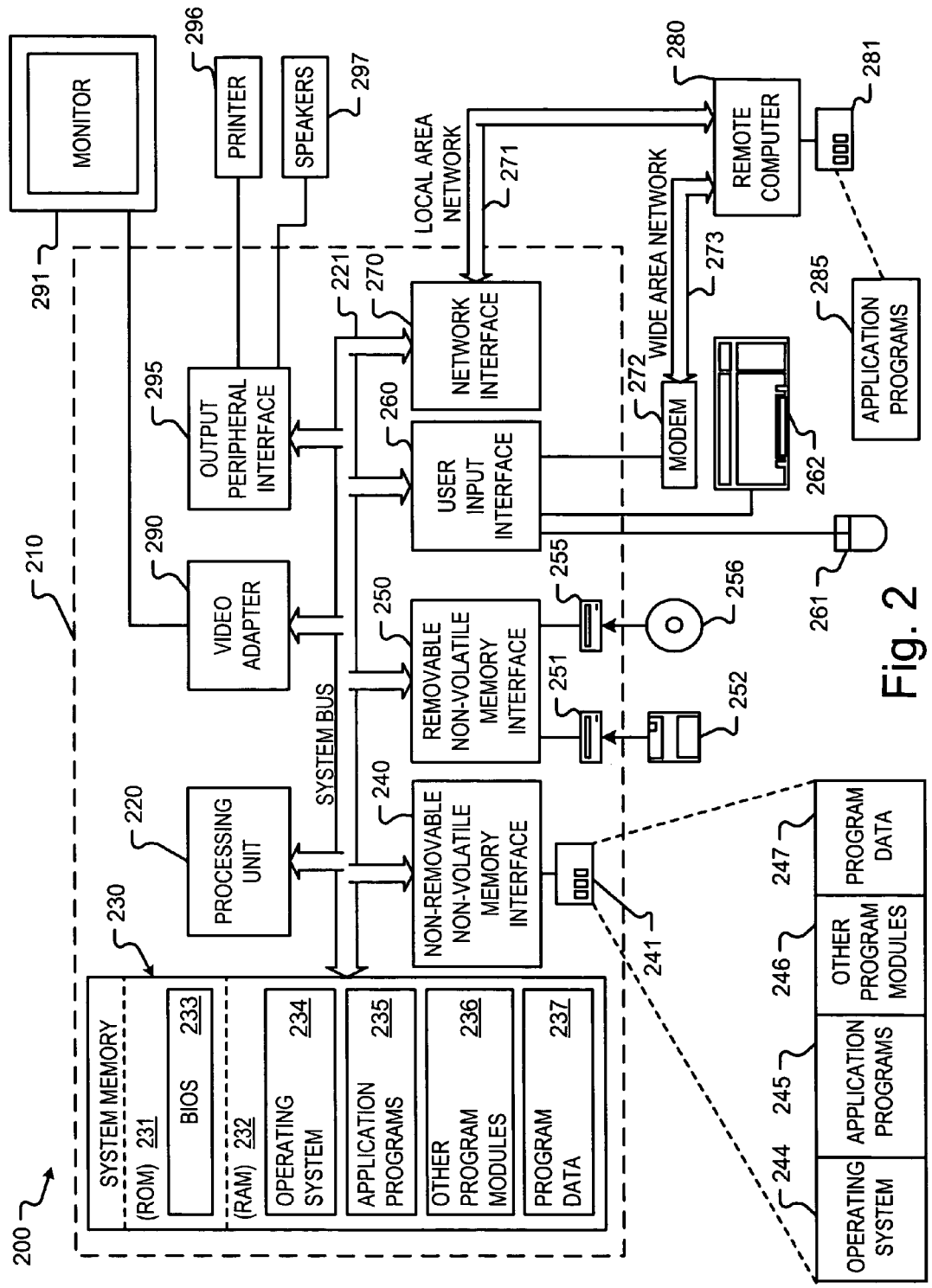
FIG. 2 is a functional diagram illustrating a computing environment and a basic computing device that operates a spreadsheet application that associates item metadata with items in the spreadsheet according to the present invention.

An example of a suitable computing system environment 200 on which the invention may be implemented is illustrated in FIG. 2. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary computer system 200 for implementing the invention includes a general purpose-computing device in the form of a computer 210. Components of the computer 210 may include, but are not limited to, a processing unit 220, a system memory 230, and a system bus 221 that couples various system components including the system memory 230 to the processing unit 220. The system bus 221 may be any of several types of bus structures including a memory bus or memory controller, a peripheral bus, or a local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnect (PCI) bus, also known as the Mezzanine bus.

Computer 210 typically includes a variety of computer readable media. Computer readable media can be any available media that can be accessed by the computer 210 and includes both volatile and nonvolatile media and removable and non-removable media. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 210. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of the any of the above should also be included within the scope of computer readable media.

The system memory 230 includes computer storage media in the form of volatile and/or nonvolatile memory, such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237; a spreadsheet application, such as application 104, would be stored as program data and displayed from RAM 232.

The computer 210 may also include other removable/non-removable, volatile/nonvolatile computer storage media. By way of example only, FIG. 2 illustrates a computer 210 with a non-removable, non-volatile memory interface 240 that reads from or writes to non-removable, nonvolatile magnetic media 241, such as a hard drive. Computer 210 may also include a non-volatile memory interface 250 that reads from or writes to a device 251, such as a disk drive, that reads from or writes to a removable, non-volatile media 252, such as a magnetic disk. In addition, the computer 210 may include an optical disk drive 255 that reads from or writes to a removable, nonvolatile optical disk 256, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface, such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules, and other data for the computer 210. For example, hard disk drive 241 is illustrated as storing operating system 244, application programs 245, other program modules 246, and program data 247, which can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through a user input interface 260 connected to user input devices, such as a keyboard 262 and pointing device 261, commonly referred to as a mouse, trackball, or touch pad. Other input devices (not shown) may include a microphone, joystick, game pad, satellite dish, scanner, or the like. These and other input devices are often connected to the processing unit 220 through a user input interface 260 that is coupled to the system bus 221, but may be connected by other interfaces and bus structures, such as a parallel port, game port, or a universal serial bus (USB).

A monitor 291 or other type of display device is also connected to the system bus 221 via an interface, such as a video interface 290. In addition to the monitor 291, the computer 210 may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks, such as wireless networks. Such networking environments are commonplace in offices, enterprise-wide computer networks, intranets, and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device 281. By way of example, and not limitation, the remote application programs 285 reside on memory device 281. It will be appreciated that the network connections shown are exemplary and other means of establishing a communications link between the computers may be used.

Figure 3:
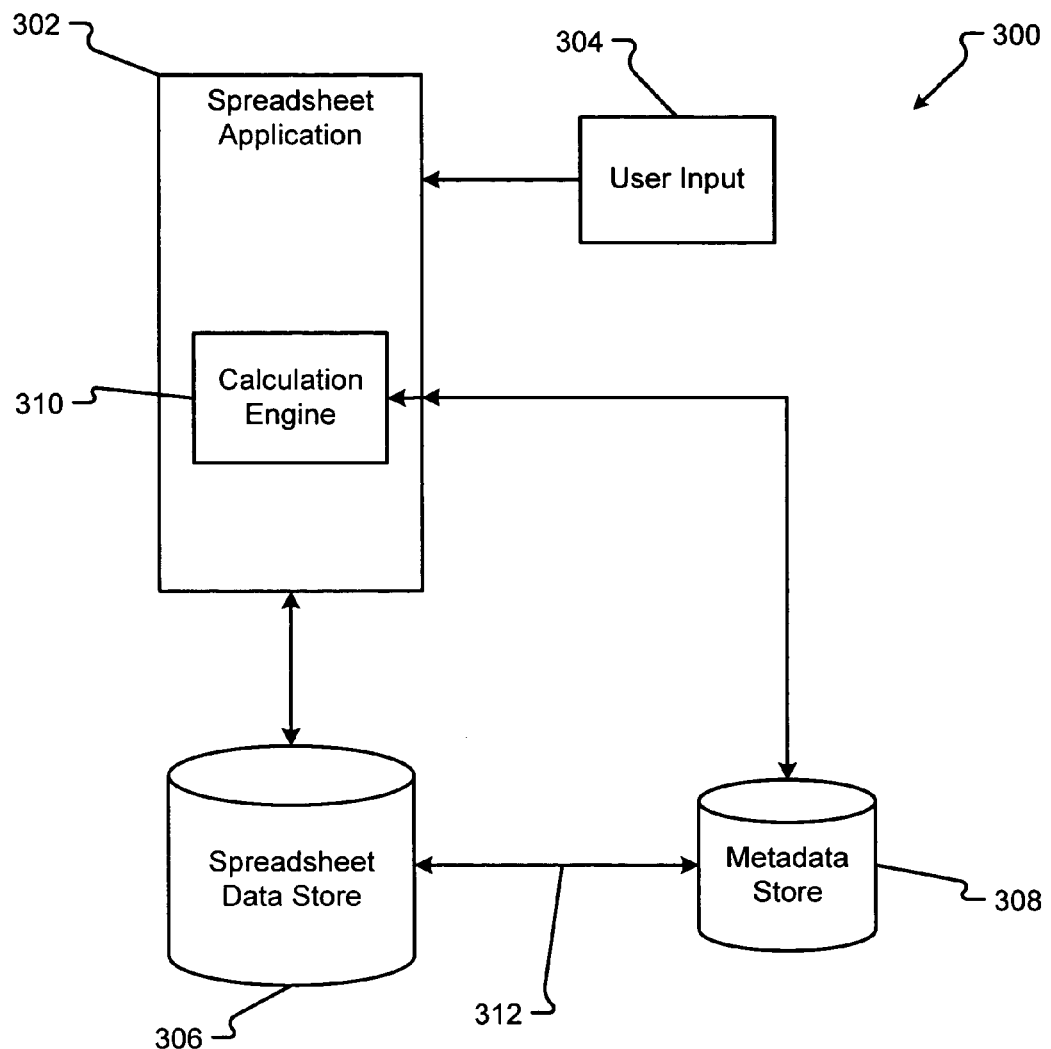
FIG. 3 is a functional diagram of a system for associating and utilizing item metadata according to the present invention.

An exemplary embodiment of a system 300 that associates items or cells with metadata is shown in FIG. 3. While the present invention can associate cell metadata with one or more cells, the present invention hereinafter describes items, item metadata, and the association of items with item metadata. One skilled in the art will recognize that the descriptions about either cell metadata or item metadata can apply to any type of metadata. In embodiments of the present invention, the system 300 comprises a spreadsheet application 302, such as Microsoft® Excel spreadsheet application. The spreadsheet application 302 stores and manipulates items in a spreadsheet, such as spreadsheet 116. In one embodiment, the spreadsheet application 302 stores the spreadsheet data in a spreadsheet data store 306. The spreadsheet data store 306, in some embodiments, is a cell table. As is explained further hereinafter, the cell table can contain the item metadata or other metadata. In other embodiments, the spreadsheet metadata, including the item metadata, is stored in a metadata store 308 separate from the spreadsheet data store 306. A link, pointer, index, or other couple 312 links the item data in the spreadsheet data store 306 to the item metadata in the metadata store 308.

In embodiments of the present invention, the spreadsheet application 302 receives user input 304. For example, a user enters item data into a spreadsheet via a graphical user interface, such as window 102. The user input 304 can be item data, item metadata, or other data. In embodiments, the spreadsheet application 302 receives item data and stores the item data into the spreadsheet data store 306. In other embodiments, the spreadsheet application 302 receives item metadata and stores the item metadata into a metadata store 308. As explained with reference to FIG. 1, the user input 304 may be direct input created by the user typing, pasting, or other deliberate action entering data into the spreadsheet. Yet, in other embodiments, the user can create item metadata incidentally by performing an action in the spreadsheet application 302, such as changing the display to show a currency symbol, which inputs item metadata. In response to receiving item metadata about an item, the spreadsheet application 302 creates or generates the link 312 between the item in the spreadsheet data store 306 and the item metadata in the metadata store 308. It should be noted that the spreadsheet data store 306 and the metadata store 308 may be combined into a single data store, and the link 312 may represent a data structure where the item metadata is stored with the item.

It should also be noted that user input may also be cell metadata, which can be stored in either the spreadsheet data store 306 or the metadata store. Cell metadata is information about one or more cells in the spreadsheet. For example, cell metadata comprises the background fill of the cell, the font used for information displayed in the cell, the type of borders displayed around the cell, the alignment of the cell, factoids (smart tags), number formats, comments, recent spell checking performed, etc. Like item metadata, cell metadata may be set by the user or created automatically. However, unlike item metadata, cell metadata may not propagate through calculation or operations on the item contained in the cell. One exemplary embodiment of cell metadata is a snapshot property. The snapshot property is a cell value at a certain time that can be compared to future values contained in the cell, and, if a value in the cell changes, cell formatting, such as cell color, may change to highlight the change in value. Another exemplary embodiment of cell metadata is a cell name. For example, the user assigns names to a cell or cells, such as "sales." The user may later reference the value(s) contained in these cells by referencing the names assigned as cell metadata.

Further embodiments of the present invention provide a calculation engine 310 in the spreadsheet application 302. The calculation engine 310 is a component within the spreadsheet application 302 that can perform operations. The operations may be mathematical, such as summation, division, multiplication, etc., or may include other functions or features, such as the Microsoft® PivotTable® dynamic views feature. One skilled in the art will recognize all the various features, functions, and/or operations that are available in the spreadsheet application 302 and performed by the calculation engine 310.

In embodiments of the present invention, the metadata in the metadata store 308 is available to the calculation engine 310. As such, any operation performed on or utilizing an item in the spreadsheet data store 306 accesses the item metadata in the metadata store 308. In some embodiments, the link 312 between the item and the item metadata ensures the calculation engine 310 accesses the item metadata when utilizing an associated item. In embodiments of the present invention, the calculation engine 310 modifies or alters the performance of an operation in response to the item metadata. It should be noted that, in embodiments of the present invention, the application or utilization of metadata is subject to the undo/redo functions or features of the spreadsheet application. Thus, operations on an item that adds, deletes, or changes metadata can be reversed or re-accomplished.

Figure 4:
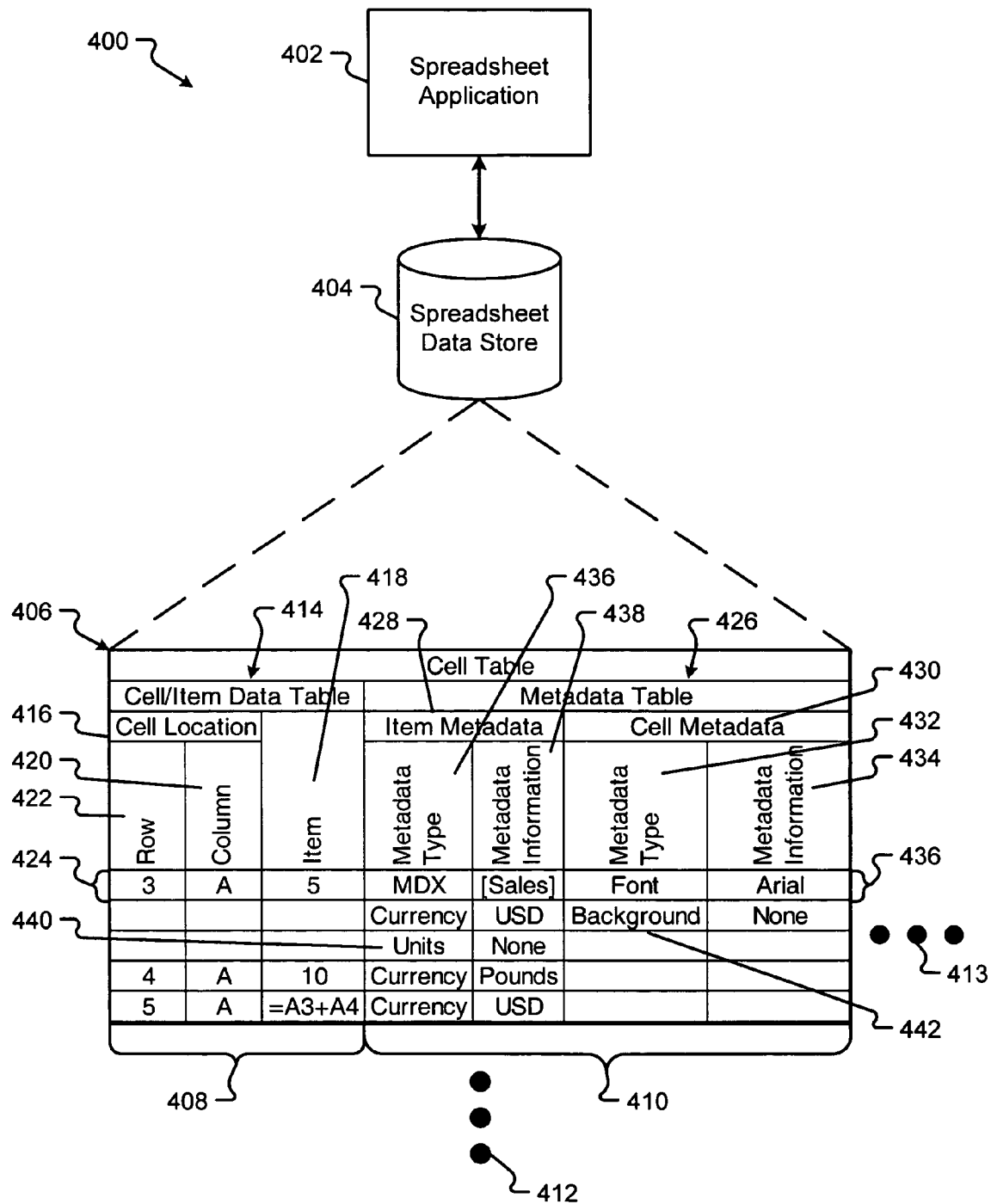
FIG. 4 is a diagram of an exemplary embodiment of a data structure for capturing item metadata for items within a spreadsheet according to the present invention.

Another exemplary system 400, including an exemplary data structure 406 for storing and associating item metadata with items, is shown in FIG. 4. In embodiments, a spreadsheet application 402, such as spreadsheet application 302, has a spreadsheet data store 404, such as spreadsheet data store 306. In this example, the spreadsheet application 402 does not generate or utilize a separate metadata store, such as metadata store 308, because the metadata is stored with the item data, as briefly discussed with reference to FIG. 3. The spreadsheet data store 404 stores at least one data structure 406, representing some or all of the item data and/or metadata entered into or created by the spreadsheet application 402. In embodiments, the data structure 406 is referred to as a cell table. The cell table 406 has at least two sections, a section for cell and/or item data 408 and a section for metadata 410. The two sections 408 and 410 may have more entries than those shown in this example, as represented by the ellipses 412 and 413.

The first section 408 of the cell table 406 represents the cell/item data table 414. The cell/item data table 414 contains one or more pieces of information about the cell or the item contained in the cell. In the example in FIG. 4, the cell/item data table 414 has two types of data. First, a cell location data type 416 represents the position of a cell in the spreadsheet, such as spreadsheet 116. In the example, the cell location 416 is specified by column data 420 and row data 422. The every cell's location is designated by the data for the intersecting row and column that form the cell. The second type of data in the cell/item data table 414 is the item data 418. The item data stores the item that is contained in the cell with a cell location specified by the cell location data 416. An example entry 424 for the cell/item data table shows that the cell located at row 3 and column A contains an item with the value of "5." The exemplary entry 424 contains data that can represent the information displayed in cell A3 128 shown in FIG. 1.

The second section 410 of the cell table 406 represents the metadata table 426. The metadata table 426 contains the one or more pieces of metadata about the spreadsheet. The metadata table 426 can have one or more sections. In the example in FIG. 4, the metadata table 426 has a section for item metadata 428 and a section for cell metadata 430. One skilled in the art will recognize that the metadata table 426, if present in the cell table 406, can have either item metadata 428, cell metadata 430, other metadata (not shown), both item metadata 428 and cell metadata 430, or all of item metadata 428, cell metadata 430, and other metadata.

The cell metadata section 430 contains information about the cells in the cell/item data table 414. Thus, the cell metadata 130 is associated with the cell and not the item in the cell. In embodiments of the present invention, the cell metadata 430 is associated with the cell by being stored with the cell information in the cell/item data table 414, as shown in FIG. 4. In this example, the cell metadata 430 has two sections, a section for the cell metadata type 432 and a section for the related cell metadata information 434. The cell metadata type 432 represents all the types of information about the cell, such as formatting and/or other information. As shown in FIG. 4, the cell metadata type information 432 can provide information about fonts or backgrounds. The metadata information section 434, as shown in FIG. 4, represents the actual information for the cell metadata type 432. For example, for the font type of cell metadata, the information in the metadata information section 434 is "Arial," which represents that the font for the item contained and displayed in cell A3 is "Arial." As such, any item contained in and displayed by cell A3 will have the same font, regardless of the item.

In contrast to the cell metadata section 430, the item metadata section 428 contains information about the items displayed by and contained in the cells in the cell/item data table 414. Item metadata 428 is associated with the item contained in the cell and not the cell that contains the item. As with the cell metadata 430, the item metadata 428, in embodiments of the present invention, are associated with the item because the item metadata 428 is stored with the item contained in the cell in the cell/item data table 414, as shown in FIG. 4. However, unlike the cell metadata 430, if the item contained in a cell moves to another cell, the item metadata 428 moves with that item. As such, an item that moves from one cell to another will have the item metadata 428 associated with that item move in the item metadata section 428 to be located with the item.

In particular this example in FIG. 4, the item metadata 428 also has two sections, a section for the item metadata type 436 and a section for the related item metadata information 438. The item metadata type 436 represents all the information about the item, such as currency, multi-dimensional expression, units, and/or other information. The metadata information section 434, as shown in FIG. 4, represents the actual information for the item metadata type 432. For example, for the currency type of item metadata, the information in the item metadata information section 434 is "$" or American Dollars, which represents that the currency for the item contained and displayed in cell A3 is American Dollars. As such, the item currently contained in and displayed by cell A3 will have the a currency of American Dollars regardless of which cell the item is contained.

An exemplary entry 436 for cell and item metadata is shown in FIG. 4. For the item currently contained in cell A3, the item has a multi-dimensional expression (MDX), explained further hereinafter, of "[Sales]," and cell A3 has a font for any item displayed in cell A3 of "Arial." As one skilled in the art will recognize from the cell table 406 in FIG. 4, each cell and each item may have numerous entries for cell metadata or item metadata. The types of metadata and the metadata information shown in FIG. 4 are only exemplary, and the present invention should not be construed as limited to the specific embodiments shown in cell table 406.

In embodiments of the present invention, the metadata table 426 includes entries for metadata type 432 and/or 436 that do not have metadata information. For example, the item metadata section 428 contains an entry for units 440 that does not have item metadata information 438, as represented by the entry "None," in FIG. 4. Likewise, the cell metadata section 430 has an entry for background color 442 that does not have cell metadata information 434, as represented by the entry "None," in FIG. 4. In embodiments of the present invention, a standard set of item metadata 428 and/or cell metadata 430 are stored and available for each cell or item. In other embodiments, if there is no metadata information, the metadata entry is eliminated for the cell or item.

Figure 5:
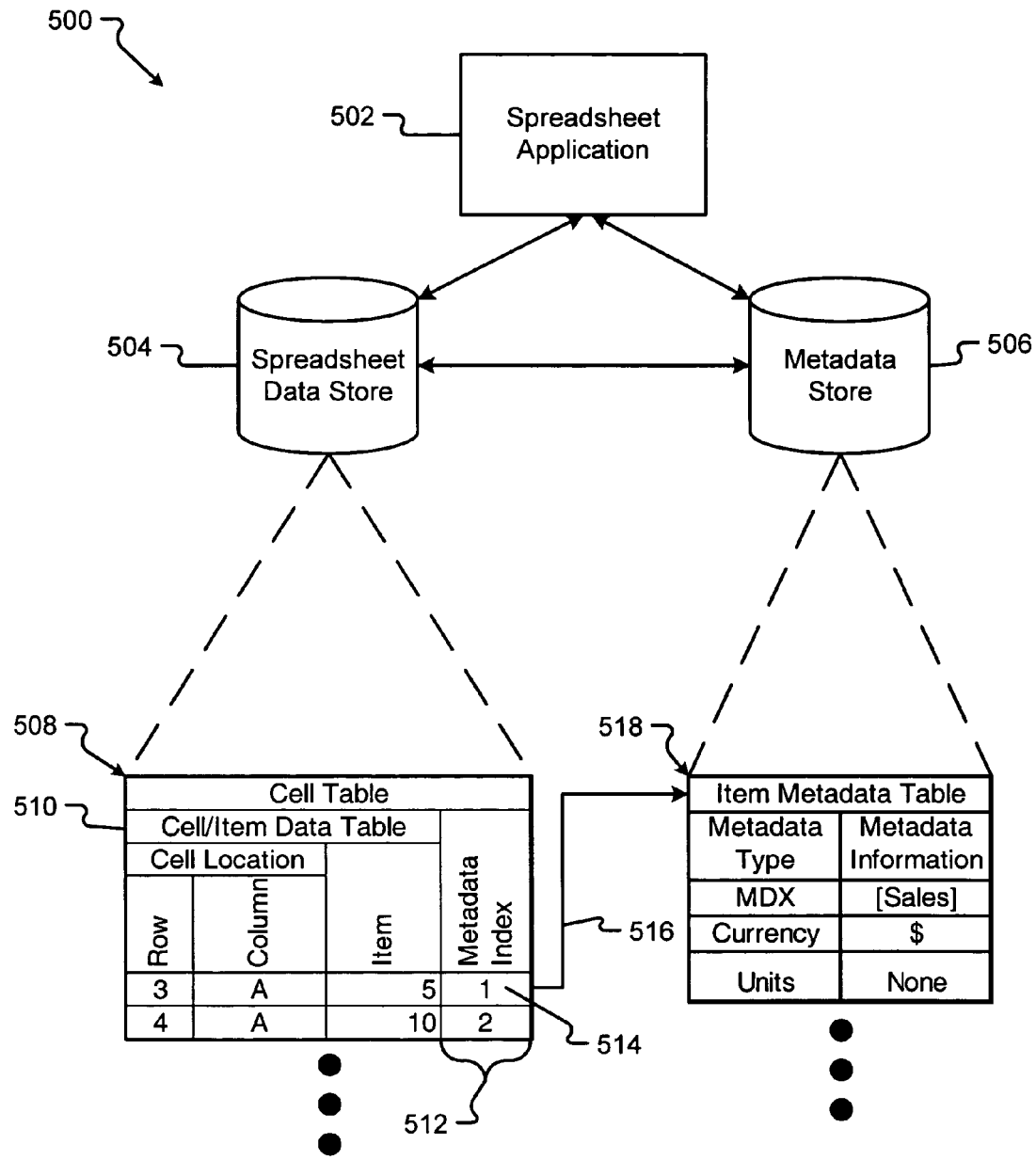
FIG. 5 is a diagram of another exemplary embodiment of a data structure for capturing item metadata for items within a spreadsheet according to the present invention.

A next exemplary system 500 and further embodiments of data structures for associating items with item metadata are shown in FIG. 5. The system 500 comprises a spreadsheet application, such as spreadsheet application 302. In contrast to the system 400 in FIG. 4, spreadsheet application 502 stores spreadsheet data in a spreadsheet data store 504, such as spreadsheet data store 306, and metadata in a metadata store 506, such as metadata store 308. While the spreadsheet data and the metadata are separately stored, the spreadsheet data and the metadata are still associated, as is explained further hereinafter.

The spreadsheet data store 504 stores a first data structure 508 referred to as the cell table 508. The cell table 508 is similar in many respects to the cell table 406 in FIG. 4. In embodiments of the present invention, the cell table 508 includes a cell/item data table 510 that is the same or similar to the cell/item data table 414 in FIG. 4. As such, cell/item data 510 table is not explained further. In contrast to the cell table 406, cell table 508 does not include a section containing metadata information, but includes a section for a metadata index 512. The metadata index 512 represents information that points to another data field or data structure that contains the metadata information. For example, metadata index entry 514 contains information that generates a pointer 516 to a metadata table 518.

Each cell in the cell table 508 can have one or more metadata indices 512. Thus, each cell may have several indices that point to two or more metadata tables. For example, one cell has two pointers, one index that points to a item metadata table and one index that points to a cell metadata table. In the particular example in FIG. 5, the cell table 508 includes only one index 514 for each item that creates a pointer 516 to point to the item metadata table 518. In embodiments of the present invention, two or more metadata indices for two or more items or two or more cells point to the same metadata table. Thus, by separating the metadata table 518 from the cell table 508, cells and/or items may share cell metadata information and/or item metadata information and reduce the amount of memory required to store the metadata information.

Figure 6:
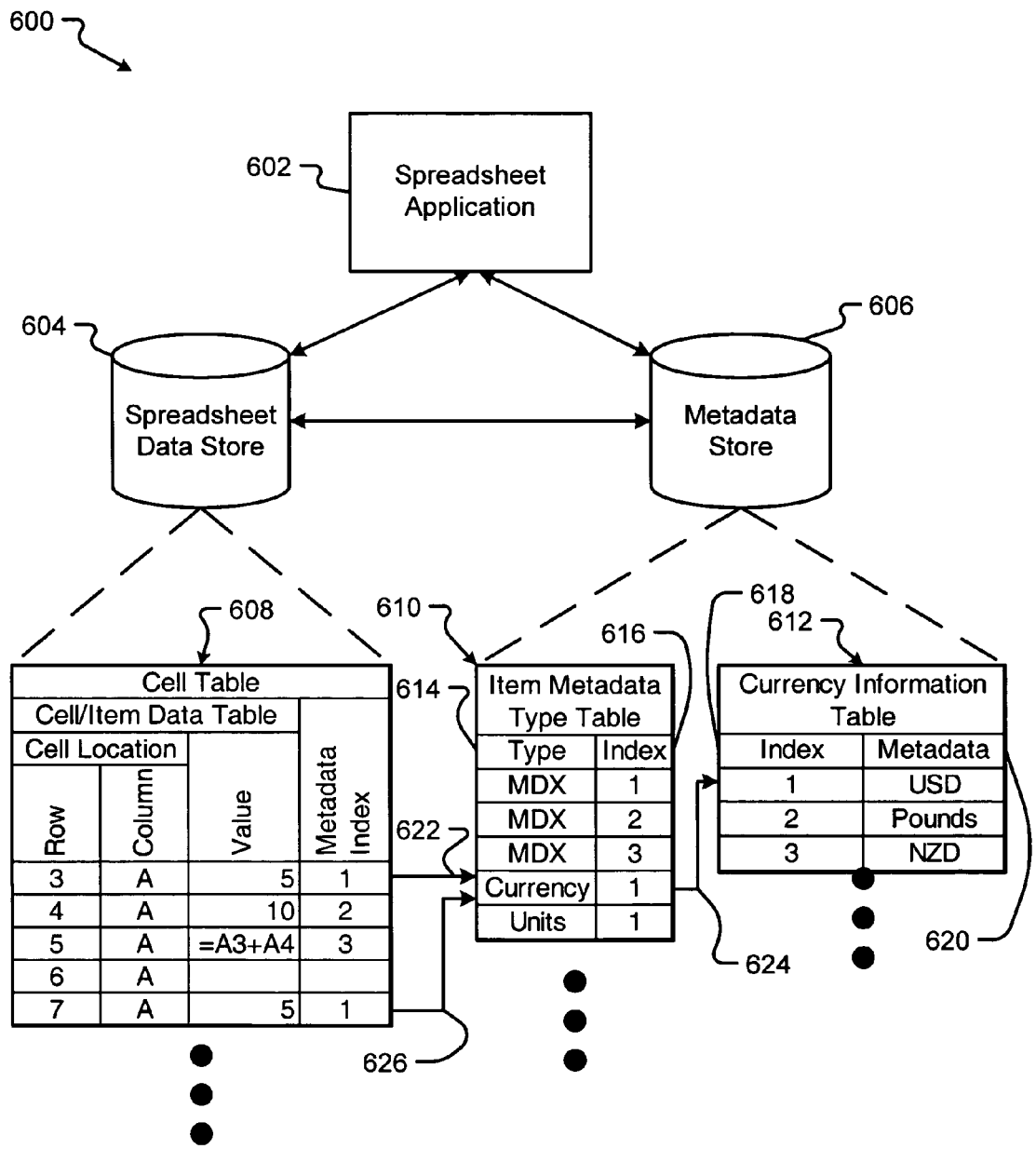
FIG. 6 is a diagram of still another exemplary embodiment of a data structure for capturing item metadata for items within a spreadsheet according to the present invention.

A next embodiment of a system 600 for associating items with item metadata is shown in FIG. 6. System 600, similar to system 500 in FIG. 5, comprises a spreadsheet application 602, such as spreadsheet application 302, that stores spreadsheet data in a spreadsheet data store 604, such as spreadsheet data store 306, and a metadata store 606, such as metadata store 308. Similarly to FIG. 5, spreadsheet data store 604 stores a cell table 608 separate from the metadata. Cell table 608 is the same or similar to cell table 508 and, as such, is not explained further.

Unlike metadata store 506 in FIG. 5, the metadata in the metadata store 606 can contain more and different data fields or data constructs. In this example, the metadata is further separated into a metadata type table 610 and a metadata type information table 612. The item metadata type table 610 comprises information about the types of item metadata that are associated with the items in the cell table 608. In one embodiment, the item metadata type table 610 comprises a type section 614 that lists the types of item metadata and an index section 616 that comprises indices to the item metadata information for that item metadata type. The index 616 creates a pointer 624 to a metadata type information table 612.

The metadata type information table 612 comprises the metadata for the metadata types in the metadata type table 610. In other words, there is one metadata type information table 612 for every metadata type in the metadata type table 610. In the example in FIG. 6, the metadata type information table 612 lists the metadata for the currency type of metadata. The metadata type information table 612, in one embodiment, comprises an index portion 618 that links the pointer from the metadata type table 610 to the correct entry in the metadata type information table 612 and a metadata portion 620 that actual includes the metadata.

In embodiments of the present invention, the system 600 associates the item in the cell table 608 with the item metadata in the metadata type information table 612 by creating a set of indices which connect the item to the item metadata. The metadata index in the cell table 608 generates a first pointer 622 that links an item contained in a cell to an entry for a type of item metadata in the metadata type table 610. Further, the index 616 in the metadata type table 610 generates a pointer 624 that links to metadata in the metadata type information table 612. As such, by combining a series of indices and pointers 622 and 624, the system 600 associates or links the item in the cell table 608 to the metadata in the metadata type information table 612.

The parsing of the metadata further into its type and then into its component metadata information allows for even more sharing of metadata than system 500 in FIG. 5. System 500 in FIG. 5 required two or more cells to share an entire set of metadata information. In contrast, system 600 allows two items to share a single piece of metadata of a certain type. For example, the item in cell A7 in FIG. 6 has the same index, which generates pointer 626 to the same entry in the metadata type table 610 as the item contained in cell A3. As such, the items in cell A3 and A7 share the same pointer 624 to the same metadata in the metadata type information table 612. In the example in FIG. 6, both cell A3 and cell A7 share the same currency metadata entry, USD in FIG. 6. Thus, both the values in cells A3 and A7 are in United States Dollars. One skilled in the art will recognize that two or more items or cells may share one or more pieces of metadata, regardless of the type of metadata and regardless of whether the metadata is item metadata or cell metadata.

Figure 7:
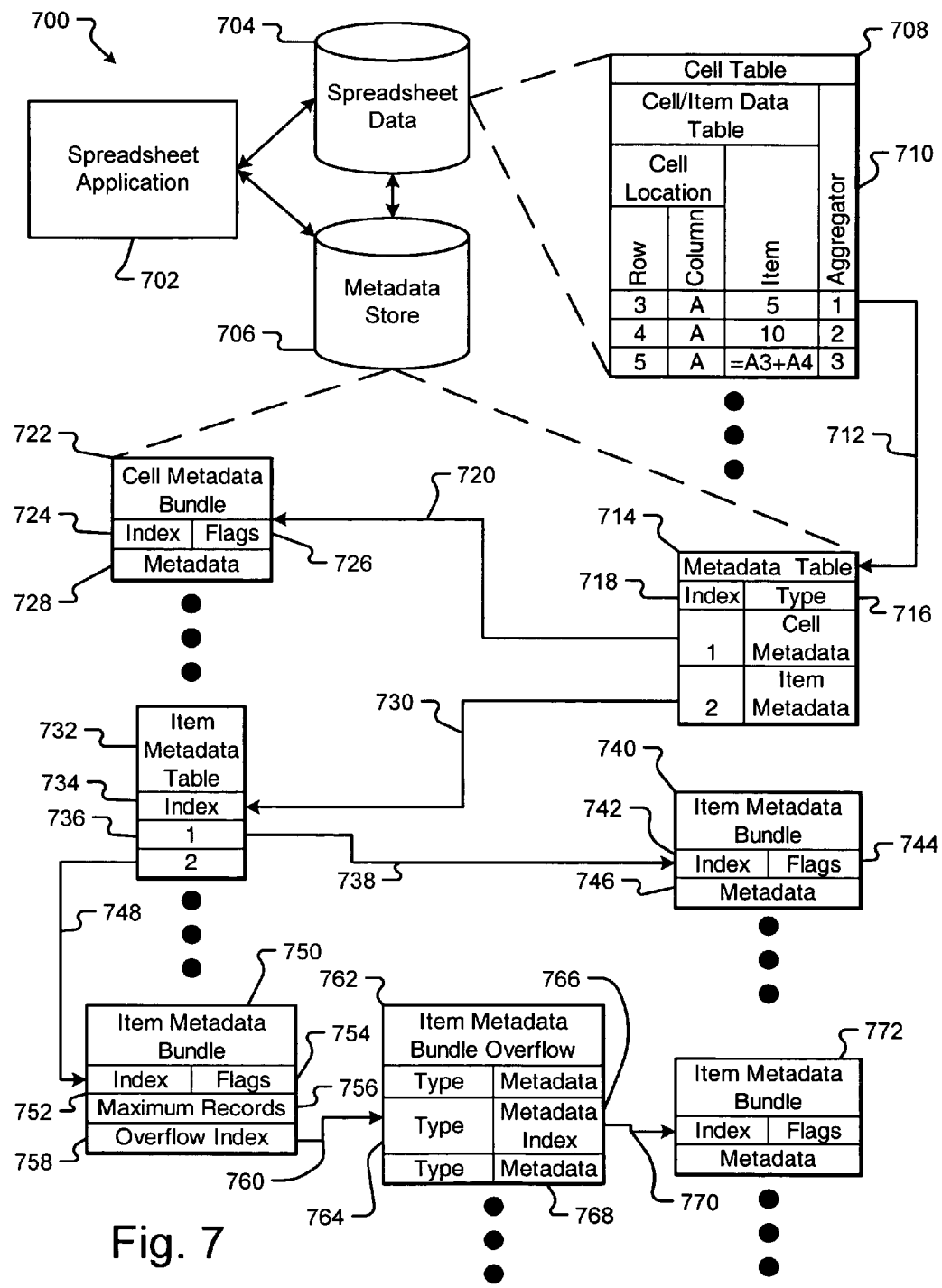
FIG. 7 is a diagram of still another exemplary embodiment of a data structure for capturing item metadata for items within a spreadsheet according to the present invention.

Another embodiment of a system 700 for associating an item with item metadata is shown in FIG. 7. System 700, similar to system 500 in FIG. 5 and system 600 in FIG. 6, comprises a spreadsheet application 702, such as spreadsheet application 302, that stores spreadsheet data in a spreadsheet data store 704, such as spreadsheet data store 306, and a metadata store 706, such as metadata store 308. Similar to FIG. 5 and FIG. 6, spreadsheet data store 704 stores a cell table 708 separate from the metadata. Cell table 708 is the same or similar to cell table 508 and 608 and, as such, is not explained further.

Unlike metadata store 506 in FIG. 5 or 606 in FIG. 6, the metadata in the metadata store 706 may contain more and different data fields or data constructs. In this example, the cell table 708 comprises an aggregator 710 that generates a pointer 712 to a metadata table 714. The aggregator is a simplified index that comprises a minimum number of bits of memory storage. All longer and more involved indices are stored in the metadata table 714 or other metadata data structures explained hereinafter. In one embodiment, the metadata table 714 comprises a type data field 716 and an indices data field 718. In a further embodiment, the type data field comprises an entry for cell metadata and an entry for item metadata, as shown in FIG. 7. The indices 718 in the metadata table 714 generate pointers to other metadata data structures. For example, the cell metadata index generates pointer 720 to cell metadata bundle 722.

A metadata bundle, such as cell metadata bundle 722, can have several data fields. In one embodiment, the metadata bundle comprises an index, such as index 724, that is the target of a pointer, such as pointer 720. The index provides the link between the metadata bundle and some other associated data structure. In embodiments, the metadata bundle comprises a flags data field, such as flags data field 726. The flags provide information about the metadata bundle and information about the metadata contained in the metadata bundle. For example, the flags may specify the type of metadata, the amount or size of the metadata, or the arrangement of the metadata in the metadata bundle.

In some embodiments, the flags represent the different types of operations that can be performed on the metadata in the metadata bundle. In one embodiment, the metadata bundle contains one or more pieces of metadata belonging to only one type of metadata specified by the type name of the metadata. The flags in this exemplary metadata bundle apply to all the type metadata in the metadata bundle. For example, if the metadata bundle included one type of item metadata, the flags determine how operations may affect the item or the item metadata as follows:

| FLAG | Meaning when FLAG is TRUE |
| --- | --- |
| ASSIGNMENT | Metadata propagates with assignment operation |
| EDITING | Metadata persists when value is edited directly |
| PASTE ALL | Metadata propagates with Paste All |
| PASTE FORMULA | Metadata propagates with Paste Formula |
| PASTE VALUE | Metadata propagates with Paste Value |
| PASTE NUMBER FORMAT | Metadata propagates with Paste Number Format |
| UNDO | Metadata changes propagate with Undo operation |
| COPY | Metadata is copied along with the value |
| MERGE | Metadata in first cell persists through merge cells operation |
| SPLITFIRST | Metadata is place in first cell through unmerge operation |
| SPLITALL | Metadata is placed in all cells with unmerge operation |
| CLEAR ALL | Metadata is cleared when user chooses Clear All |
| CLEAR FORMATS | Metadata is cleared when format is cleared |
| CLEAR CONTENTS | Metadata is cleared when contents are cleared |
| ADJUST | Metadata is adjusted when location changes |

In another embodiment, a metadata bundle contains several pieces of metadata of two or more types. In this example, each type of metadata in the metadata bundle shares a set of flags. For example, if a metadata bundle stores two or more types of cell metadata, the flags determine how operations may affect each cell with the types of cell metadata as follows:

| FLAG | Meaning when FLAG is TRUE |
| --- | --- |
| EDITING | Metadata persists when cell is edited directly |
| DELETION | Metadata is deleted when cell contents are deleted |
| GHOSTROW | Metadata is copied from ghost when empty cell gets value |
| GHOSTCOL | Metadata is copied from ghost when empty cell gets value |
| PASTE ALL | Metadata propagates with Paste All |
| PASTE FORMULA | Metadata propagates with Paste Formula |
| PASTE VALUE | Metadata propagates with Paste Value |
| PASTE CELL FORMAT | Metadata propagates with Paste Cell Format |
| PASTE COMMENT | Metadata propagates with Paste Comment |
| PASTE VALIDATION | Metadata propagates with Paste Validation |
| PASTE BORDERS | Metadata propagates with Paste Borders |
| PASTE COLUMN WIDTHS | Metadata propagates with Paste Column Widths |
| PASTE NUMBER | Metadata propagates with Paste Number |
| FORMAT | Format |
| UNDO | Metadata changes propagate with Undo operation |
| COPY | Metadata is copied along with the cell |
| MERGE | Metadata in first cell persists through merge cells operation |
| SPLITFIRST | Metadata is place in first cell through unmerge operation |
| SPLITALL | Metadata is placed in all cells with unmerge operation |
| ROW/COL INSERTION | Metadata moves with cell as result of row or column insertion |
| CLEAR ALL | Metadata is cleared when user chooses Clear All |
| CLEAR FORMATS | Metadata is cleared when format is cleared |
| CLEAR CONTENTS | Metadata is cleared when contents are cleared |
| CLEAR COMMENTS | Metadata is cleared when comments are cleared |
| ADJUST | Metadata is adjusted when location changes |

In further embodiments, the metadata bundle comprises a metadata data field, such as metadata data field 728. The metadata field 728 comprises the actual metadata. In one embodiment, the metadata bundle is a cell metadata bundle 722 and the metadata 728 comprises metadata about the one or more cells associated with the metadata bundle. For example, the metadata comprises information about cell background color, cell font type, or other cell formatting. One skilled in the art will recognize other types of information that may be contained in the metadata data field. In addition, one skilled in the art will recognize that the metadata bundle can comprise more or fewer data fields than those explained in the present embodiments.

Another index in the metadata table 714 for the item metadata generates another pointer 730 to an item metadata table 732. Unlike the metadata bundle 722, the item metadata table 732 does not provide metadata information, but the item metadata table 732 comprises an index data field 734 with one or more indices that associate the item contained in the cell in the cell table 708 to one or more pieces of item metadata. It should be noted that, in some embodiments, an index, similar to item metadata table 732, may be used with the cell metadata bundles, such as cell metadata bundles 722. In one embodiment, a first index 736 generates a pointer 738 to an item metadata bundle 740. Item metadata bundle 740, in one embodiment, comprises the same data fields as cell metadata bundle 722. For example, item metadata bundle comprises an index data field 742, a flags data field 744, and a metadata data field 746. As such, the item metadata bundle 740 is not explained in further detail, but it should be noted that the item metadata data field 746 comprises information about the item contained in the cell, such as currency, units, etc., and not about the cell A second index in the item metadata table 732 generates pointer 748 to a second item metadata bundle 750. In embodiments of the present invention, the item metadata bundle 750 is different than item metadata bundle 740. While item metadata bundle 750 may comprise some of the same data fields, such as the index 752 and the flags 754, item metadata bundle 750 also comprises a maximum records data field 756 and an overflow index 758. In some embodiments, the item metadata bundles have a restricted size and require an overflow data structure if the metadata becomes too voluminous to store in the bundle. As such, the maximum records field 756 comprises data about the amount of metadata in the item metadata bundle 750 and/or the amount of metadata in an item metadata bundle overflow 762. The overflow index 758 generates a pointer 760 to the item metadata bundle overflow 762. In one embodiment, the item metadata bundle 750 comprises both metadata and the overflow index 758, but, in other embodiments, the item metadata bundle 750 only comprises the overflow index 758.

In embodiments of the present invention, the item metadata bundle 762 comprises a type data field 764 and a metadata field 766 and/or 768. The type field 764 describes the type of item metadata in the bundle overflow 762. The type field 764 is the same or similar to the type data filed 614 in FIG. 6 and, as such, is not explained further. The metadata field can contain metadata, such as metadata 768 or another metadata index 766. The metadata index 766 generates a further pointer 770 to yet another item metadata bundle 772. With the metadata data structures 714, 722, 732, 740, 750, 762, and/or 772 and the generated pointers 712, 720, 730, 738, 748, 760, and/or 770, the system 700 associates cells or items in the cell table 708 to metadata.

The system 700 provides data structures for greater sharing of metadata at different levels of abstraction. In one embodiment, two items contained in two separate cells can share all the same metadata, whether cell metadata or item metadata, by using the same aggregator 710. However, in embodiments, no two cells share an aggregator 710, but share metadata bundles, such as metadata bundle 722 or 740. In other embodiments, two or more cells can share the same cell metadata but not the same item metadata by having the same index, such as index 718, to generate a similar pointer, such as pointer 720, to the same cell metadata bundle, such as cell metadata bundle 722. The reverse situation may also apply, where two or more items share the same item metadata, but the cells containing the items are associated with different cell metadata.

However, two items or cells can share more discrete pieces of metadata. For example, two items may each associate with a different item metadata table. The two item metadata tables can each have the same index to the same metadata bundle, such as metadata bundle 740, but every other index may be different. In this way, the two items share an entire metadata bundle. In further embodiments, two separate metadata bundle overflows may share one metadata index, such as index 766, to one item of metadata. Thus, two items associate with the same piece of metadata but not any other piece of metadata.

To share metadata, the system 700, in one embodiment, calculates a hash for the metadata bundles already stored. When adding metadata, the system 700 calculates a hash value for the new metadata and reviews the hash values of the existing metadata to determine if the metadata to be added is the same as some existing metadata. Like metadata is not stored in two areas, but the system 700 creates another pointer to associate the existing metadata with the new item or cell.

By maximizing the available metadata that may be shared, memory usage is reduced as fewer metadata entries are used and because the indices and pointers are less memory intensive than storing multiple copies of metadata. Memory usage is an important consideration. A typical spreadsheet can have over 15 million cells. To store one piece of metadata for each item or cell, each cell may have to store 8 bytes of data in memory. Thus, the total storage necessary for a single spreadsheet could near 1 gigabit. As one skilled in the art will recognize, only a few large spreadsheets with multiple items of metadata will use up all the storage possible in many of today's computer systems. As such, the present invention provides embodiments of data structures to lower the memory requirements.

Figure 8:
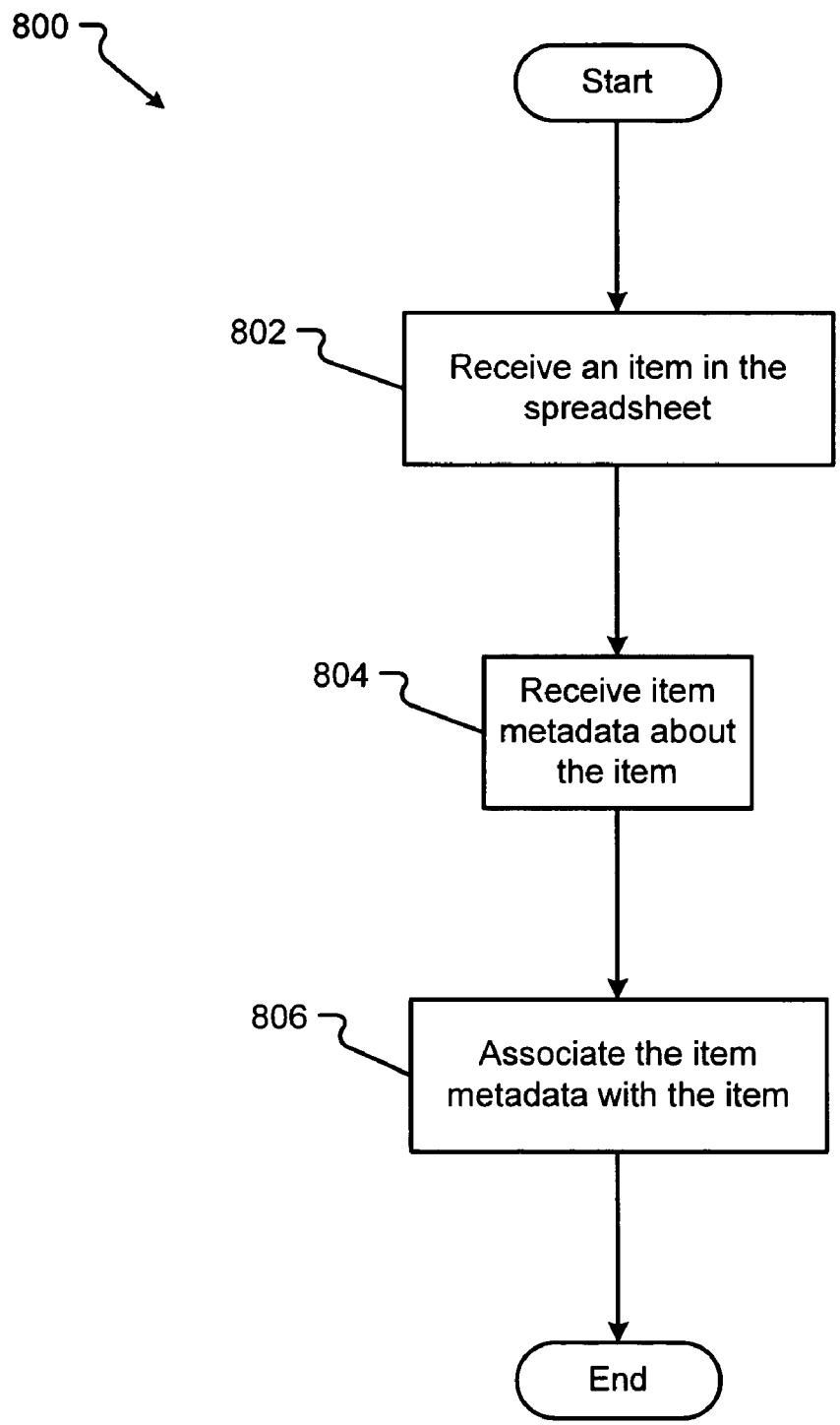
FIG. 8 is a flow diagram representing an embodiment of the present invention for creating spreadsheet metadata by associating item metadata to an item in the spreadsheet.

An exemplary embodiment of a method 800 for creating spreadsheet metadata is shown in FIG. 8. In embodiments of the present invention, receive operation 802 receives an item, such as the item in cell A3 128 of FIG. 1, in a spreadsheet, such as spreadsheet 116. In one embodiment, the user inputs the item into the spreadsheet using a user interface. For example, the user types the item into the cell. In another example, the user pastes the item into the cell. In some embodiments, the item may be contained in two or more cells.

Receive operation 804 receives metadata about the item. In one embodiment, the user enters the metadata with a user interface, such as menu 140. In other embodiments, the user completes an action that automatically creates the item metadata incident the action. For example, the user may change the display of an item to include the currency of that item. In changing the display, the user may inadvertently create item metadata that specifies the currency of the item associated with the item metadata. In some embodiments, the item metadata is associated to two or more items. Item metadata may also be received before the item is received. For example, the user specifies that all items in a part of the spreadsheet are of a certain currency. Then, the user pastes a value into that part of the spreadsheet, but the value has no associated metadata. Upon pasting the item, the spreadsheet associates the currency metadata already present with the item.

Finally, associate operation 806 associates the item metadata with the item. In embodiments of the present invention, the data structure of the spreadsheet allows the item metadata to move and couple to the item. In one embodiment, the item metadata is stored with the item in the cell table, such as cell table 406. In another embodiment, an index, such as index 512 is created that generates a pointer, such as pointer 516, to the item metadata or other data structure, such as item metadata table 732, that couples to the item metadata.

Figure 9:
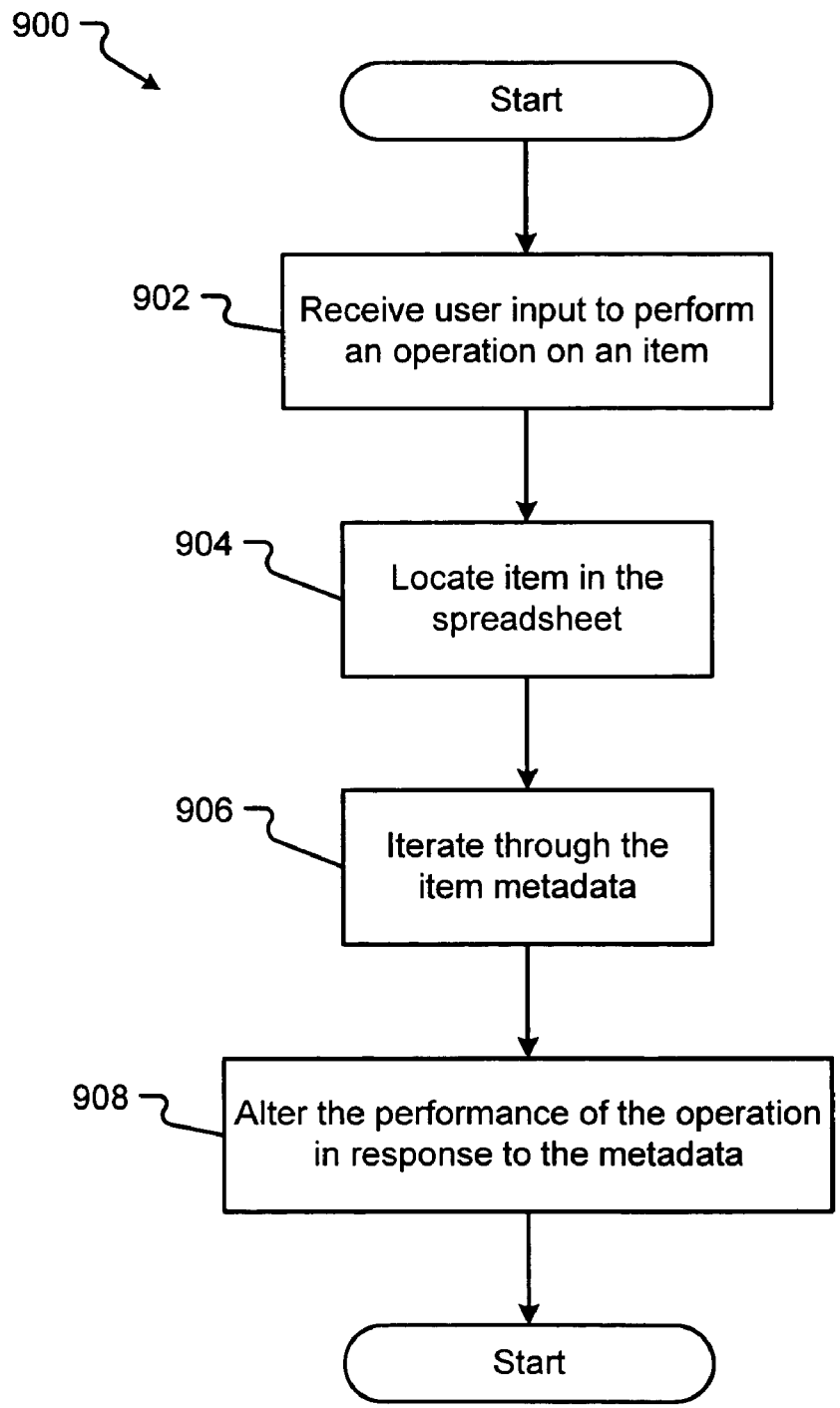
FIG. 9 is a flow diagram representing an embodiment of the present invention for altering the performance of an operation in response to item metadata.

An exemplary embodiment of a method 900 for changing the performance of an operation within a spreadsheet based on metadata is shown in FIG. 9. Receive operation 902 receives user input to perform an operation. In embodiments of the present invention, a spreadsheet system, such as system 300, receives user input, such as user input 304, to perform an operation in a spreadsheet, such as spreadsheet 122. In one embodiment, the user enters a formula, such as formula 138 shown in FIG. 1. In one embodiment, a calculation engine, such as calculation engine 310, receives the formula.

Then, locate operation 904 locates the item(s) in the spreadsheet. In one embodiment, the calculation engine retrieves the input(s) from a spreadsheet data store, such as spreadsheet data store 306. The located item(s) are input into the calculation engine to apply the operation to the input(s). Iterate operation 906 iterates through the item metadata, such as item metadata 428, associated with the item(s). In one embodiment, the calculation engine determines the type of metadata required by the type of operation and/or type(s) of item(s) located in the spreadsheet. For example, if the operation is a summation of two values, the calculation engine determines that the item metadata type should be units or currency, rather than MDX. As such, the calculation engine quickly iterates through the appropriate indices, such as index 736, to locate the associated item metadata of the certain type.

In response to finding item metadata that is relevant to the operation, alter operation 908 alters the performance of the operation. For example, as explained in conjunction with FIG. 1, the calculation engine changes the value that is input into the operation based on the item's currency. In this example, the calculation engine retrieves current exchange rates and converts the value to a different currency before adding it to the other item or items. One skilled in the art will recognize other embodiments where the spreadsheet system alters the performance of an operation based on metadata.

In one embodiment, each operation or function in the spreadsheet contains a set of flags, such as flags 726 described in conjunction with FIG. 7. The flags signify if the operation or function uses metadata. In one embodiment, there are two flags. One flag per function argument and one flag for the type of metadata. The argument flag will connote whether the argument in the operation uses metadata or does not understand metadata. The type flag will connote whether the metadata can be removed from the item. These two flags allow the spreadsheet to either use or not use the metadata depending on the operation and the input(s) into the operation.

Many types of item metadata may exist. Some particular embodiments have been explained above, such as currency or units metadata. Another particular type of item metadata is multi-dimensional expression (MDX) metadata. MDX metadata is a set of expressions used to retrieve or return a data item from a multi-dimensional database, such as an online analytical processing (OLAP) database. OLAP databases are known in the art. To retrieve information from an OLAP or other database, a user enters an expression. For example, if a user desires to input into a spreadsheet the "amount of bicycle sales in December for the City of Seattle," the user may enter the expression: "([sales], [bicycle], [December], [Seattle])." This expression returns a number from the database, such as 5. The returned data may have a second different piece of MDX metadata depending on the request and the database. For example, the expression that asks for the months in the first quarter of the year 2000 may be:

"[Time].[2000].[Q1].children," while the MDX expression for the set of returned values may be:

"{[Time].[Month].&[Jan], [Time]. [Month].&[Feb], [Time]. [Month].&[Mar]}." Both the requesting MDX and the returned MDX may be item metadata.

In other embodiments, the item metadata is not attached to a specific item in the spreadsheet but to an intermediate item or value used in an operation. For example, in the summation of the two currency values, one value is converted from one currency to another currency. The result of the conversion is never seen in the spreadsheet. Rather, the converted currency value is an intermediate item derived from the currency conversion. This converted currency value has item metadata. Specifically, the converted currency metadata for the intermediate value is dollars in the particular example.

Although the present invention has been described in language specific to structural features, methodological acts, and computer-readable media containing such acts, it is to be understood that the present invention defined in the appended claims is not necessarily limited to the specific structure, acts, or media described. One skilled in the art will recognize other embodiments or improvements that are within the scope and spirit of the present invention. Therefore, the specific structure, acts, or media are disclosed as exemplary embodiments of implementing the claimed invention. The invention is defined by the appended claims.

What is claimed is:

1. A computer-readable storage medium storing computer-executable instructions for executing a computer implemented method for creating spreadsheet metadata, the method comprising:

receiving an item in a cell contained in a spreadsheet;
receiving item metadata about the item;
associating the item metadata with the item to create spreadsheet metadata; and
storing the item in a cell table, wherein the cell table includes an item data table and a metadata table wherein the item data table is divided into a first section and a second section, the first section of the item data table storing location information about the cell and the second section of the item data table storing the item contained in the cell, wherein the metadata table stores information about the spreadsheet and is divided into a first section and a second section, the first section of the metadata table storing cell metadata and the second section of the metadata table storing the item metadata, wherein the cell metadata comprises a cell metadata type section and a cell metadata information section, and wherein the item metadata comprises an item metadata type section and an item metadata information section.

2. The computer-readable storage medium defined in claim 1, wherein receiving item metadata further comprises:
receiving an input related to the item; and
automatically creating the item metadata incident to the input.

3. The computer-readable storage medium defined in claim 1, further comprising:
receiving the cell metadata about the one or more cells containing the item; and
associating the cell metadata with the one or more cells.

4. The computer-readable storage medium defined in claim 1, wherein storing the item in a cell table further comprises:
storing the item metadata with the item in the cell table.

5. The computer-readable storage medium defined in claim 1, further comprising:
receiving an input to perform an operation on an item: and
altering the performance of the operation in response to item metadata.

6. A computer system for creating spreadsheet metadata, the system comprising:
one or more processors for executing computer executable instructions;
one or more computer readable storage media storing instructions that when executed by any one or more processors perform a method comprising:
receiving an item in a cell contained in a spreadsheet;
receiving item metadata about the item;
associating the item metadata with the item to create spreadsheet metadata; and
storing the item in a cell table, wherein the cell table includes an item data table and a metadata table wherein the item data table is divided into a first section and a second section, the first section of the item data table storing location information about the cell and the second section of the item data table storing the item contained in the cell, wherein the metadata table stores information about the spreadsheet and is divided into a first section and a second section, the first section of the metadata table storing cell metadata and the second section of the metadata table storing the item metadata, wherein the cell metadata comprises a cell metadata type section and a cell metadata information section, and wherein the item metadata comprises an item metadata type section and an item metadata information section.

7. The computer system defined in claim 6, wherein receiving item metadata further comprises:
receiving an input related to the item; and
automatically creating the item metadata incident to the input.

8. The computer system defined in claim 6, wherein the method further comprises:

receiving the cell metadata about the one or more cells containing the item; and associating the cell metadata with the one or more cells.

9. The computer system defined in claim 6, wherein the storing the item in a cell table further comprises:

storing the item metadata with the item in the cell table.

10. The computer-readable storage medium defined in claim 1, wherein the cell metadata contains information about the cell and wherein the item metadata contains information about the item contained in the cell.

11. A method of performing an operation on data contained in a spreadsheet, the method comprising:

receiving a first data item in one or more cells of a spreadsheet;

receiving metadata about the first item;

associating the metadata with the first item to create spreadsheet data;

storing the first data item and the metadata of the first item in a cell table, wherein the cell table includes an item data table and a metadata table wherein the item data table is divided into a first section and a second section, the first section of the item data table storing location information about the cell and the second section of the item data table storing the item contained in the cell, wherein the metadata table stores information about the spreadsheet and is divided into a first section and a second section, the first section of the metadata table storing cell metadata and the second section of the metadata table storing item metadata, wherein the cell metadata comprises a cell metadata type section and a cell metadata information section, and wherein the item metadata comprises an item metadata type section and an item metadata information section.

* * * * *

UNITED STATES PATENT AND TRADEMARK OFFICE
CERTIFICATE OF CORRECTION

Page 1 of 1

PATENT NO. : 7,693,860 B2
APPLICATION NO. : 11/083492
DATED : April 6, 2010
INVENTOR(S) : Alexander A. Babanov et al.

It is certified that error appears in the above-identified patent and that said Letters Patent is hereby corrected as shown below:

In column 2, line 10, before "DESCRIPTION" insert -- BRIEF --.

Signed and Sealed this
Twenty-fourth Day of May, 2011

David J. Kappos
*Director of the United States Patent and Trademark Office*